US009477690B2

(12) United States Patent
Lucero et al.

(10) Patent No.: US 9,477,690 B2
(45) Date of Patent: Oct. 25, 2016

(54) METHOD AND APPARATUS FOR MEASURING INFORMATION ASSOCIATED WITH ANOTHER DEVICE

(71) Applicant: Nokia Corporation, Espoo (FI)

(72) Inventors: Andres Lucero, Tampere (FI); Petri Piippo, Lempaala (FI); Juha Arrasvuori, Tampere (FI); Marion Boberg, Suinula (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 542 days.

(21) Appl. No.: 13/758,611

(22) Filed: Feb. 4, 2013

(65) Prior Publication Data

US 2014/0222855 A1 Aug. 7, 2014

(51) Int. Cl.
*G06F 17/30* (2006.01)
(52) U.S. Cl.
CPC ................ *G06F 17/30283* (2013.01)
(58) Field of Classification Search
CPC .......... G06F 17/30864; G06F 17/30867; G06F 17/30067
USPC .................................... 707/705, 769
See application file for complete search history.

(56) References Cited

U.S. PATENT DOCUMENTS

| 7,319,992 B2 * | 1/2008 | Gaos ........................... 706/62 |
| 7,412,224 B2 * | 8/2008 | Kotola ................ H04W 4/008 348/14.01 |
| 2006/0077514 A1 * | 4/2006 | Sampsell ............ G02B 26/001 359/290 |
| 2007/0064443 A1 * | 3/2007 | Dunn .................. G02B 6/0068 362/612 |
| 2007/0198432 A1 * | 8/2007 | Pitroda .................. G06Q 20/02 705/64 |
| 2008/0170054 A1 * | 7/2008 | Chou ..................... G09G 3/3426 345/205 |
| 2010/0211596 A1 * | 8/2010 | Tang .................... G06F 17/3089 707/769 |
| 2010/0280904 A1 * | 11/2010 | Ahuja ..................... 705/14.58 |
| 2010/0318656 A1 * | 12/2010 | Ferren ..................... H04L 63/18 709/225 |
| 2011/0010453 A1 * | 1/2011 | Roy .............................. 709/225 |
| 2011/0117955 A1 * | 5/2011 | Lee .................... H04M 1/72569 455/550.1 |
| 2012/0059826 A1 * | 3/2012 | Mate .................. G06F 17/30843 707/737 |
| 2012/0252495 A1 * | 10/2012 | Moeglein ............... G01S 19/26 455/456.3 |
| 2014/0006955 A1 * | 1/2014 | Greenzeiger ....... G06F 11/3006 715/733 |

OTHER PUBLICATIONS

Gellerson et al., Multi-Sensor Context-Awareness in Mobile Devices and Smart Artifacts, 2002, 11 pages.*

* cited by examiner

*Primary Examiner* — Noosha Arjomandi
(74) *Attorney, Agent, or Firm* — Ditthavong & Steiner, P.C.

(57) ABSTRACT

An approach is provided for presenting a measure of relevant information stored on or associated with a nearby device using one or more lighting parameters and/or one or more short-range communication technologies. An information platform determines one or more queries from at least one device. The information platform causes, at least in part, a measurement of an amount of information associated with one or more other devices that is responsive to the one or more queries. The information platform further causes, at least in part, a presentation of one or more representations of the amount.

18 Claims, 11 Drawing Sheets

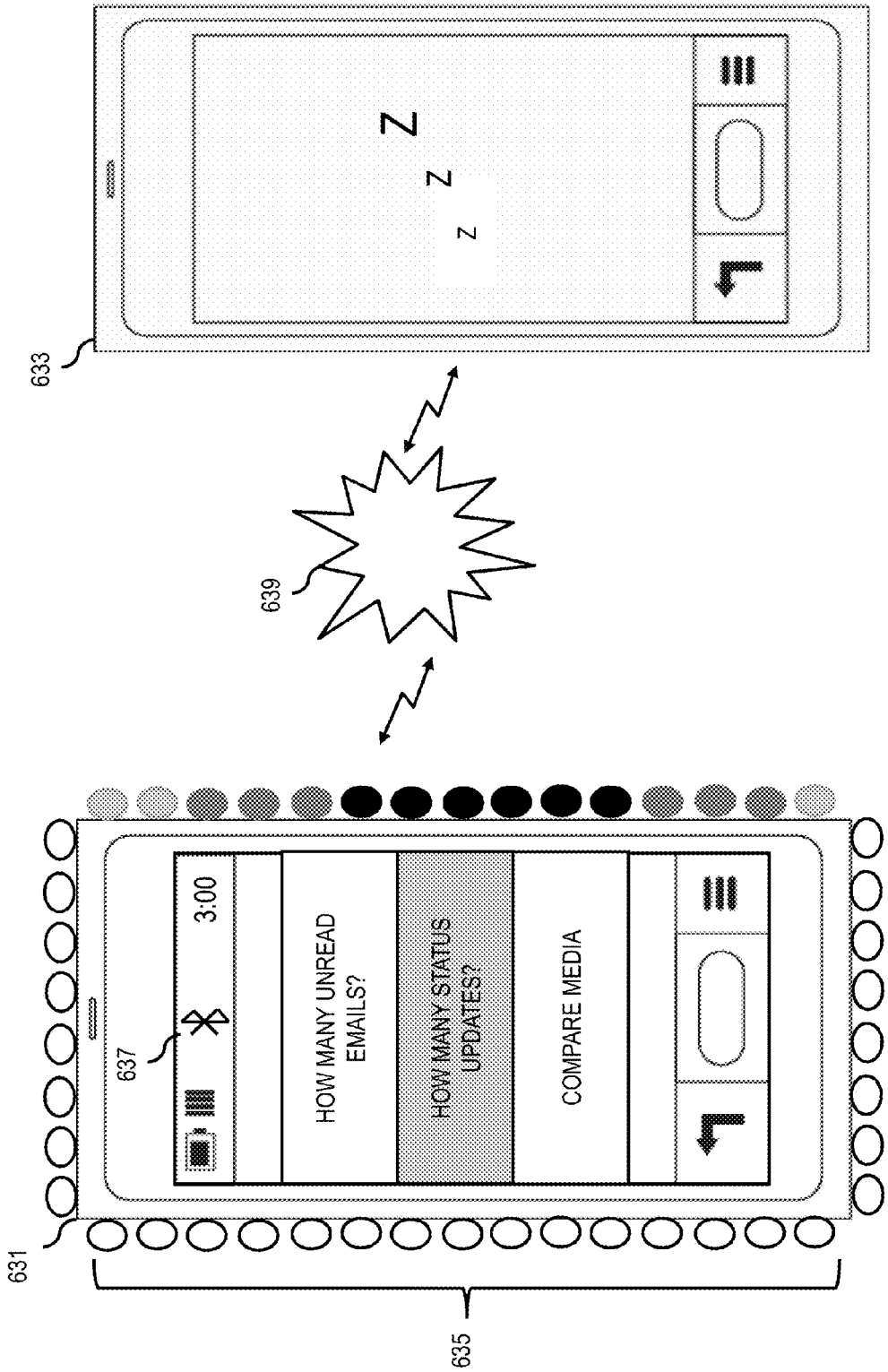

METHOD AND APPARATUS FOR MEASURING INFORMATION ASSOCIATED WITH ANOTHER DEVICE

BACKGROUND

Service providers and device manufacturers (e.g., wireless, cellular, etc.) are continually challenged to deliver value and convenience to consumers by, for example, providing compelling network services. One area of interest has been the development of applications and network services that enable a user to utilize his or her mobile device (e.g., a mobile phone or a tablet) to access information associated with a nearby device, especially when that device does not have a display or is turned off. More specifically, the utilization may be based, at least in part, on one or more short-range communication technologies such as Bluetooth® (Bluetooth), Bluetooth LE (BLE), near field communication (NFC), wireless fidelity (WiFi), or combination thereof. Another area of interest has been the development of applications and network services that present relevant information associated with a mobile device to a user in a quick and effective manner (e.g., through one or more audio, visual, and/or haptic notifications). However, visual notifications are generally limited to a single light emitting diode (LED) and/or to the constraints of a mobile device's display. Therefore, service providers and device manufacturers face significant technical challenges in providing a service that uses short-range communication technologies and various lighting parameters to effectively display the measure of information stored on and/or associated with a nearby device.

SOME EXAMPLE EMBODIMENTS

Therefore, there is a need for an approach for presenting a measure of relevant information stored on or associated with a nearby device using one or more lighting parameters and/or one or more short-range communication technologies.

According to one embodiment, a method comprises determining one or more queries from at least one device. The method also comprises causing, at least in part, a measurement of an amount of information associated with one or more other devices that is responsive to the one or more queries. The method further comprises causing, at least in part, a presentation of one or more representations of the amount.

According to another embodiment, an apparatus comprises at least one processor, and at least one memory including computer program code for one or more computer programs, the at least one memory and the computer program code configured to, with the at least one processor, cause, at least in part, the apparatus to determine one or more queries from at least one device. The apparatus also causes, at least in part, a measurement of an amount of information associated with one or more other devices that is responsive to the one or more queries. The apparatus further causes, at least in part, a presentation of one or more representations of the amount.

According to another embodiment, a computer-readable storage medium carries one or more sequences of one or more instructions which, when executed by one or more processors, cause, at least in part, an apparatus to determine one or more queries from at least one device. The apparatus also causes, at least in part, a measurement of an amount of information associated with one or more other devices that is responsive to the one or more queries. The apparatus further causes, at least in part, a presentation of one or more representations of the amount.

According to another embodiment, an apparatus comprises means for determining one or more queries from at least one device. The apparatus also comprises means for causing, at least in part, a measurement of an amount of information associated with one or more other devices that is responsive to the one or more queries. The apparatus further comprises means for causing, at least in part, a presentation of one or more representations of the amount.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of user interfaces utilized in the processes of FIGS. 3-5, according to various embodiments;

DESCRIPTION OF SOME EMBODIMENTS

Examples of a method, apparatus, and computer program for presenting a measure of relevant information stored on or associated with a nearby device using one or more lighting parameters and/or one or more short-range communication technologies are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
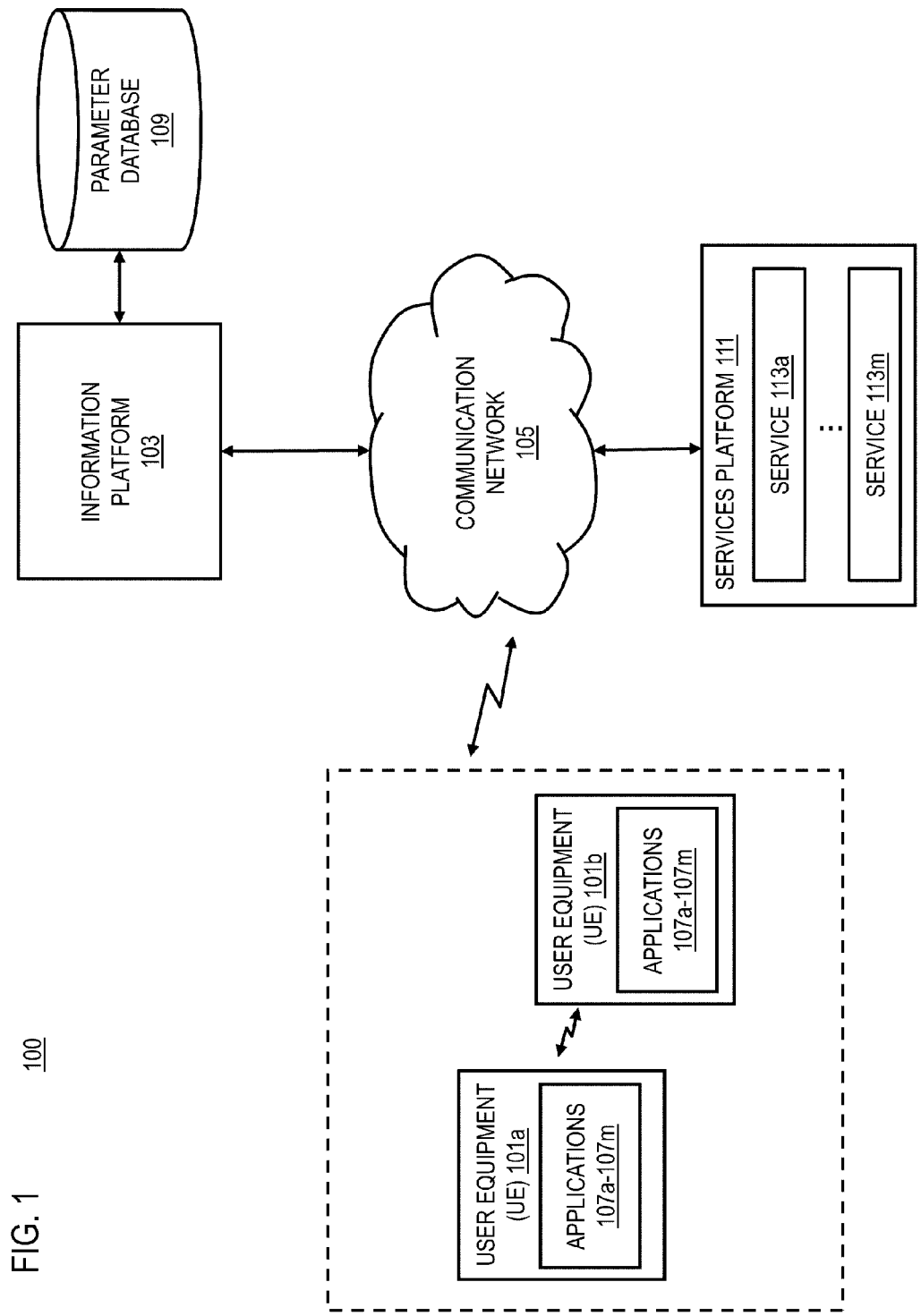
FIG. 1 is a diagram of a system capable of presenting a measure of relevant information stored on or associated with a nearby device using one or more lighting parameters and/or one or more short-range communication technologies, according to one embodiment.

FIG. 1 is a diagram of a system capable of presenting a measure of relevant information stored on or associated with a nearby device using one or more lighting parameters and/or one or more short-range communication technologies, according to one embodiment. As previously discussed, one area of interest among service providers and device manufacturers has been the development of applications and network services that enable a user to utilize his or her mobile device to access information associated with a nearby device, especially when that device does not have a display or is turned off. In particular, the utilization may be based on one or more short-range communication technologies (e.g., Bluetooth, BLE, NFC, WiFi, or a combination thereof). Another area of interest has been the development of applications and network services that present relevant information associated with a mobile device to a user in a quick and effective manner (e.g., through one or more audio, visual, and/or haptic notifications). However, visual notifications are generally limited to a single LED and/or to the constraints of the device's display.

To address this problem, a system 100 of FIG. 1 introduces the capability to present a measure of relevant information stored on or associated with a nearby device using one or more lighting parameters and/or one or more short-range communication technologies. As shown in FIG. 1, the system 100 comprises one or more user equipment (UE) 101a and 101b (also collectively referred to as UEs 101) having connectivity to an information platform 103 via a communication network 105. In one embodiment, it is contemplated that one UE 101 (e.g., UE 101a) may be a mobile phone or a tablet and one or more other UEs 101 (e.g., UE 101b) may be a mobile phone, a personal computer, a laptop computer, a tablet, digital video recorder (DVR), a digital media box, a cloud service access point, a printer/scanner/fax device, a hard disc drive or hard drive, a sensor device (e.g., a glucometer), etc. The UEs 101 also have connectivity to one another via one or more short-range communication technologies (e.g., Bluetooth, BLE, NFC, WiFi, or a combination thereof). The UEs 101 also include or have access to one or more applications 107a-107m (also collectively referred to as applications 107). By way of example, the applications 107 may include one or more messaging applications (e.g., email, text, etc.), one or more media applications (e.g., photographs, videos, music, etc.), one or more social networking applications, one or more biosensor applications (e.g., for testing blood sugar levels), etc. In one embodiment, the system 100 has been simplified to include only two UE 101s (e.g., the UE 101a and the UE 101b), however, it is contemplated that that any number of UEs 101 can be utilized in measuring relevant information associated with one another as long as the UE 101 are equipped with one or more short-range communication technologies (e.g., Bluetooth and/or NFC) and at least one UE 101 (e.g., the UE 101a) is associated with an array of one or more lights (e.g., LED lights of various colors).

In one embodiment, the information platform 103 may include or be associated with at least one parameter database 109. In one example embodiment, the information platform 103 may exist in whole or in part within a UE 101, or independently and the parameter database 109 may exist in whole or in part within the information platform 103. The parameter database 109 may include one or more color parameters, a light intensity parameter, a blink frequency parameter, a light direction parameter, or a combination thereof associated with the array. The parameter database 109 may also include one or more credentials associated with the UE 101s (e.g., the UE 101b). Further, the parameter database 109 also may include one or more question templates for quick selection by a user (e.g., "How many unread emails?").

The UEs 101 are also connected to a services platform 111 via the communication network 105. The services platform 111 includes one or more services 113a-113n (also collectively referred to as services 113). The services 113 may include a wide variety of services such as content provisioning services for one or more of the applications 107. By way of example, the services 113 may include messaging services, media services, social networking services, diagnostic services, etc.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the system 100 determines one or more user-defined queries from at least one device (e.g., the UE 101a) and then obtains a "reading" related to the question from a second device (e.g., the UE 101b). By way of example, the system 100 can determine one or more queries entered by a user using his or her mobile device (e.g., the UE 101a). More specifically, the one or more queries may include "how many unread e-mails?" or "how many social networking status updates?" or "how many unseen media items?" In addition, where privacy is less of a concern, the system 100 may determine queries such "how many unseen television program records are on my DVR?" or "when will the next bus arrive?" In one embodiment, the system 100 determines the one or more queries based, at least in part, on a user freely typing the question on his or her mobile device (e.g., the UE 101a), speech-to-text input, or utilization of one or more question templates. In addition, in one embodiment, it is contemplated that the system 100 may determine a query based, at least in part, on a user inputting one or more different media types. By way of example, the query may include, at least in part, a textual question such as "How many photos are similar to this one?" and a visual component consisting of a photo (e.g., "this one"). In one embodiment, it is contemplated that the second device (e.g., the UE 101b) may be a biosensor connected to a user. Therefore, the system 100 can determine a query such as "How high is the blood sugar level?"

In one embodiment, the system 100 determines a proximity, a direction, or a combination thereof of the one or more other devices (e.g., the UE 101b) relative to the at least one device (e.g., the UE 101a). For example, a user may request information, but does not know on which device this information is stored. The system 100 can determine through the at least one device (e.g., the UE 101a) in what direction there is a device with relevant information based, at least in part, on implementation of NFC or Bluetooth ID (e.g., the Bluetooth radio strength is used to measure which of the one or more other devices is closest to the at least one device making the query). In one embodiment, it is contemplated that the one or more other devices (e.g., the UE 101b) may include a close-proximity radio transmitter sticker/label so that user may be able to scan for locations of products within a store. For example, the user may define the products to purchase in an electronic shopping list on his or her at least one device (e.g., the UE 101a) and then when entering a supermarket, for example, the system 100 can cause, at least in part, a rendering of the one or more lights to indicate the direction of where the items on the shopping list are located within the store.

In one or more embodiments, the system 100 determines at least one status of the one or more other devices (e.g., the UE 101b). By way of example, the system 100 may determine that the one or more other devices is running in stand-by mode or is not able to exchange information because either it does not have one or more short-range communication technologies or because the device is turned off. In the example use case where the one or more other devices are running, the system 100 can cause, at least in part, at least one transfer of one or more credentials associated with the one or more other devices (e.g., a user ID and/or password) from the at least one device (e.g., the UE 101a). In certain embodiments, it is in contemplated that the system 100 may skip the credential checking and/or credential transmission step. In one embodiment based, at least in part, on the one or more credentials, the system 100 causes, at least in part, a measurement of an amount of information associated with the one or more other devices (e.g., the UE 101b) that are responsive to the one or more queries. For example, the system 100 can measure the number of unread emails in respective accounts associated with the one or more other devices (e.g., 10 unread emails in Account "A" and 25 unread emails in Account "B").

In one or more embodiments, the system 100 determines the measurement of the amount of information based, at least in part, on one or more touch interactions, one or more proximity detection mechanisms, or a combination thereof between the at least one device and the one or more other devices. By way of example, the user may place the at least one device (e.g., the UE 101a) in the proximity of the one or more other devices (e.g., the UE 101b) or on top of the one or more other devices to initiate the device query via NFC or Bluetooth. More specifically, as used herein, the term "touch" (e.g., touch interaction) refers to a method of expediting wireless configuration (e.g., device discovery and selection) based, at least in part, on proximity (e.g., Received Signal Strength Indication (RSSI) values). In particular, touching between the at least one device (e.g., the UE 101a) and one or more other devices (e.g., the UE 101b), at least for the purposes of the current disclosure, does not require that the system components (e.g., the UE 101a and the UE 101b) actually come into physical contact with each other. Holding the system 100 components in close proximity to one another (i.e., the RSSI reading of the discoverable device reaches a threshold criteria relative to the discovering device) for a short duration of time may be enough to trigger operations, after which the devices may be separated and utilized within the communication range of whatever wireless interaction may be implemented utilizing various types of short-range wireless communication technologies (e.g., Bluetooth, Bluetooth LE, NFC, WiFi, or a combination thereof).

In the example use case where the one or more devices are in a stand-by mode or are turned off, the system 100 can cause, at least in part, at least one modification of the at least one status based, at least in part, on the one or more touch interactions, the one or more proximity detection mechanisms, or a combination thereof. For example, by placing the at least one device (e.g., the UE 101a) in close proximity of the one or more other devices (i.e., starting the device query via NFC or Bluetooth), the at least one device can cause, at least in part, the one or more other devices (e.g., the UE 101b) to power-up. In the example use case where the one or more other devices are turned off, the system 100 can cause, at least in part, the at least one device (e.g., the UE 101a) to prompt the user to power-up the one or more other devices (e.g., the UE 101b).

In one embodiment, the system 100 causes, at least in part, a presentation of one or more representations of the amount of information associated with the one or more other devices (e.g., the UE 101b) that are responsive to the one or more queries (e.g., "how many unread emails?"). More specifically, the presentation includes, at least in part, an array of one or more lights (e.g., LEDs) and the one or more representations include, at least in part, one or more color parameters, a light intensity parameter (e.g., a dim blue light can represent one unread email and a bright blue light can represented ten unread emails), a blinking frequency parameter, a light direction parameter, or a combination thereof. By way of example, the array (e.g., an array of LED lights) can be part of an additional functional cover for the at least one device or a "rubber band" type of loop that is stretched around the at least one device and the at least one device and the array can communicate through a physical connection or one or more short-range communication technologies (e.g., NFC or Bluetooth). Moreover, in one example use case, a user can define the mapping between the amount of information and an indicating color of the array. Consequently, based, at least in part, on a default setting, the system 100 can cause the array to display a green color representing a large amount of relevant information, a yellow color representing some relevant information, and a red color to indicate that there is no relevant information associated with the one or more other devices.

Figure 6A:
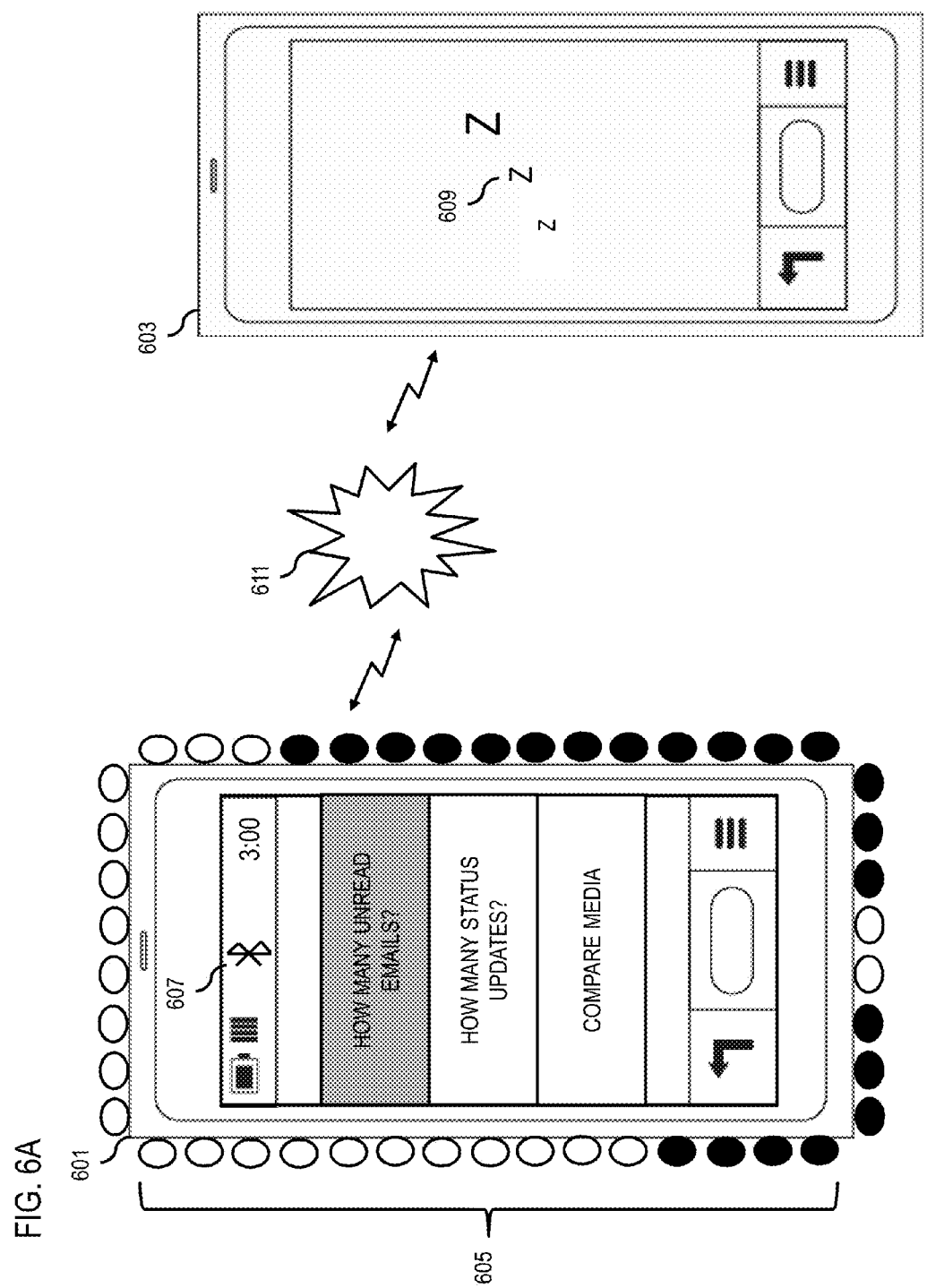

In certain embodiments, it is contemplated that the user may customize the mapping between the light color of the array and the amount of information. By way of example, a user may want to know "how many messages are on a device." The user could map the left side of the at least one device (e.g., the UE 101a) to a social networking account and the right side to an email account. As a result, the system 100 can cause, at least in part, the one or more lights on left side to represent how many social networking messages the user has whether in terms of a number of lights, a color of lights, etc. and the one or more lights on the right side to represent how many emails or text messages the user has, again, whether in terms of number of lights, a color of lights, etc. An illustration of this example use case is depicted in FIG. 6A. In another example use case, the user may further customize the mapping to so that the array displays both an amount and a type of information. For example, in one embodiment the one or more other devices (e.g., the UE 101b) may store both short message service (SMS) messages and e-mails and the presence of one or more new SMS messages may be indicated by a corresponding number of blue lights and the presence of one or more new e-mails may be indicated by a corresponding number of green lights.

In one embodiment, the system 100 causes, at least in part, the presentation based, at least in part, on the proximity, the direction, or a combination thereof of the one or more other devices (e.g., the UE 101b). By way of example, the array of lights on the at least one device (e.g., the UE 101a) may indicate in which direction there are one or more other devices that contain relevant information and/or whether any such devices are proximate to the at least one device. In one embodiment, the system 100 can also cause, at least in part, the presentation based, at least in part, on at least one status of the one or more other devices. For example, in the example use case where the one or more other devices are turned off, the system 100 can cause, at least in part, the array to render as blinking pink lights.

In one embodiment, the system 100 can determine one or more inputs associated with the array of one or more lights. By way of example, the user can map the array of one or more lights to function as a reminder of unfinished tasks for the day. The system 100 can then determine whether a user has touched one or more of the lights. In one embodiment, once the user touches or touches near the one or more lights, the system 100 causes, at least in part, at least one access of information associated with the at least one device based, at least in part, on the one or more inputs. For example, in this example use case, as a result of touching the one or more lights, the at least one device (e.g., the UE 101a) shows the unfinished task on the display of the device or on a connected larger display. More specifically, a to-do list for the 12-hour day can be mapped along the circumference of the at least one device so that, e.g., the to-do event at 9 a.m. is presented through the one or more lights on the left middle side of the at least one device. Moreover, before 9 a.m., the system 100 can render the one or more lights as green, but if the user does not do the task, the system 100 can render the one or more lights as red, for example. In another example use case, a calendar of events can similarly be mapped along the circumference of the at least one device. For example, the system 100 can render a 3:00 p.m. doctor's appointment with one or more lights in the middle of the right side of the at least one device and a requirement to take medication at 6:00 p.m. with one or more lights towards the bottom of the at least one device. Further, the system 100 can enable a user to customize the rendering so that calendar events are not shown specifically on the device display when other users are nearby, but instead are rendered through the one or more color-coded lights to protect the user's privacy.

By way of example, the UEs 101, information platform 103, the applications 107, the services platform 111, and the services 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
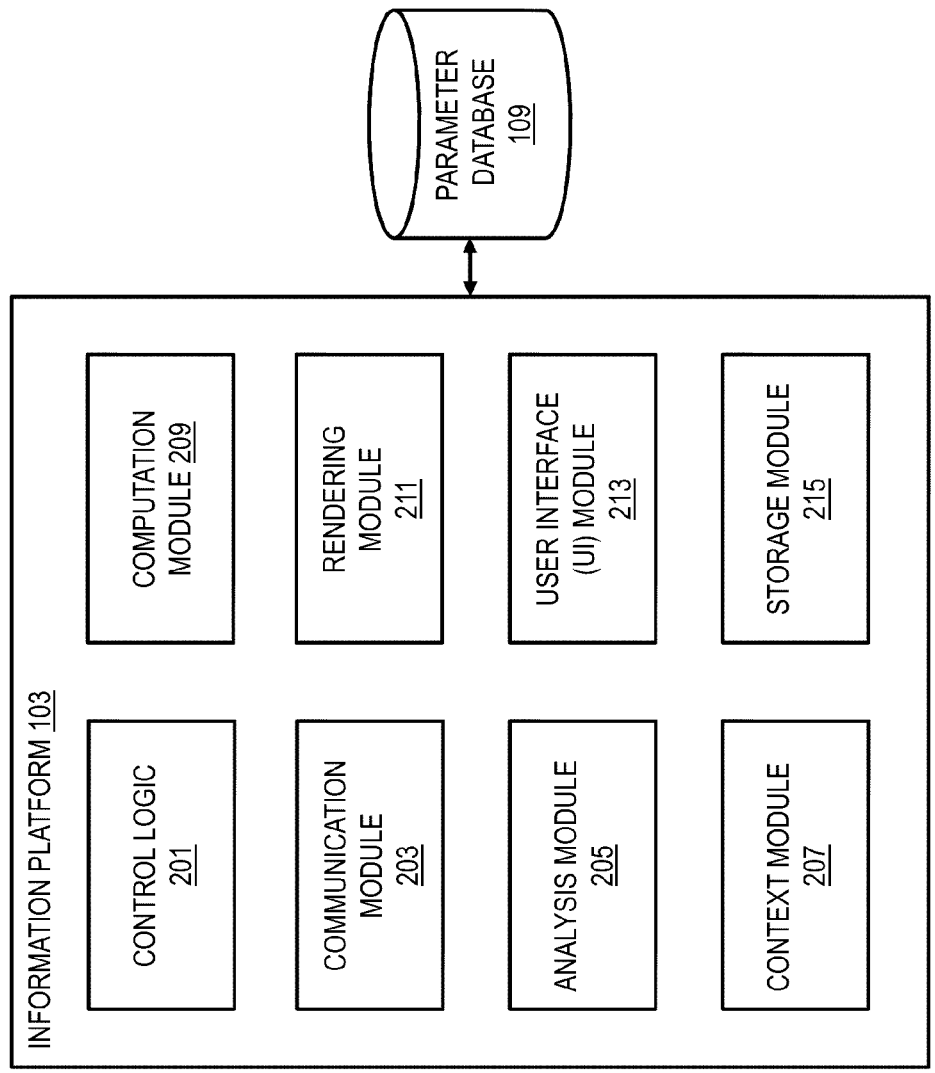
FIG. 2 is a diagram of the components of an information platform, according to one embodiment.

FIG. 2 is a diagram of the components of an information platform 103, according to one embodiment. By way of example, the information platform 103 includes one or more components for presenting a measure of relevant information stored on or associated with a nearby device using one or more lighting parameters and/or one or more short-range communication technologies. It is contemplated that the functions of these components may be combined in one or more components or performed by other components of equivalent functionality. In this embodiment, the information platform 103 includes a control logic 201, a communication module 203, an analysis module 205, a context module 207, a computation module 209, a rendering module 211, a user interface (UI) module 213, and a storage module 215.

The control logic 201 oversees tasks, including tasks performed by the communication module 203, the analysis module 205, the context module 207, the computation module 209, the rendering module 211, the UI module 213, and the storage module 215. For example, although the other modules may perform the actual task, the control logic 201 may determine when and how those tasks are preformed or otherwise direct the other modules to perform the task. The control logic 201 may also be used to cause, at least in part, a measurement of an amount of information associated with one or more other devices that is responsive to the one or more queries. For example, as previously discussed, a user may want to know in which direction there is one or more other devices (e.g., the UE 101b) that contain information related the user's question as well as the amount of information contained on each of the one or more other devices. The control logic 201 also may be used to cause, at least in part, at least one modification of the at least one status of the one or more other devices based, at least in part, on the one or more touch interactions, the one or more proximity detection mechanisms, or a combination thereof. By way of example, the control logic can cause the one or more other devices (e.g., the UE 101b) to power up when in touch proximity with the at least one device (e.g., the UE 101a).

The communication module 203 in certain embodiments is used for communication between the UEs 101, the information platform 103, the applications 107, the services platform 111, the services 113, and the parameter database 109. The communication module 203 may be used to communicate commands, requests data, etc. The communication module 203 also may be used to cause, at least in part, at least one transfer of one or more credentials associated with the one or more other devices (e.g., a user ID and/or a password) from the at least one device (e.g., the UE 101).

Further, the communication module 203 may also be used to cause, at least in part, at least one access of information associated with the at least one device (e.g., a to-do list) based, at least in part, on the one or more inputs (e.g., touching or touching near the one or more lights of the array).

In one embodiment, the analyzer module 205 determines one or more queries from the at least one device (e.g., the UE 101a). In particular, the one or more queries may include, at least in part, one or more user entries, one or more question templates, one or more types of media, or a combination thereof. For example, the analyzer module 205 may determine that a user wants to know the number of unread e-mails, the number of social networking updates, the number of similar photos, etc. that are associated with one or more other devices (e.g., the UE 101b). The analyzer module 205 may also be used to determine the status of the one or more other devices. By way of example, the analyzer module 205 may determine that the one or more other devices are running, in a stand-by mode, or turned off.

The context module 207 in certain embodiments is used to determine a proximity, a direction, or a combination thereof of the one or more other devices relative to the at least one device. More specifically, the context module 207 can determine the RSSI value, for example, of the one or more other devices to determine which of the one or more other devices (e.g., the UE 101b) is the closest device to the at least one device making the query (e.g., the UE 101a).

In one embodiment, the computation module 209 determines the measurement of the amount of information based, at least in part, on one or more touch interactions, one or more proximity detection mechanisms, or a combination thereof between the at least one device and the one or more other devices. By way of example, the computation module 209 can determine the number of unread emails, for example, on a laptop that has a closed lid or is in a user's backpack. Moreover, the computation module 209 can determine the number of unread emails, for example, for respective email accounts associated with a user, the one or more other devices, or a combination thereof. Similarly, the computation module 209 can determine the number of unseen TV programs, unviewed photographs, new voice messages, social networking posts, etc.

The rendering module 211 in certain embodiments is used to cause, at least in part, a presentation of one or more representations of the amount of information associated with one or more other devices that is responsive to the one or more queries. More specifically, the rendering module 211 causes, at least in part, the one or more representations based, at least in part, on one or more color parameters, a light intensity parameter, a blinking frequency parameter, a light direction parameter, or a combination thereof associated with the array. For example, as previously discussed, the rendering module 211 can render the array of one or more lights (e.g., color LEDs) based, at least in part, on a default mapping wherein a green color represents a large amount of relevant information, a yellow color represents that some relevant information is associated with the one or more other devices, and a red color indicates that there is no relevant information. The rendering module 211 may also be used to cause, at least in part, the presentation based, at least in part, on the proximity, the direction, or a combination thereof. For example, the rendering module 211 can render the array of one or more lights to indicate in what direction there are one or more other devices (e.g., the UE 101b) containing information related to a user's question and the color of the lights may simultaneously indicate the quantity of the information. In addition, the rendering module 211 also may be used to cause, at least in part, the presentation based, at least in part, on the at least one status. For example, the rendering module 211 can render the array of one or more lights a blinking pink lights to indicate that one or more other devices are turned off and therefore are unable to exchange information with the at least one device (e.g., the UE 101*a*).

In one embodiment, the UI module 213 is used to determine one or more inputs associated with the array of one or more lights. For example, the UI module 213 may determine that the one or more lights are functioning as "buttons" for accessing information related to the particular light on the at least one device (e.g., the UE 101*a*). In certain embodiments, the storage module 215 is used to manage the storage of one or more color parameters, a light intensity parameter, a blink frequency parameter, a light direction parameter, or a combination thereof in the parameter database 109. The storage module 207 also may be used to manage the storage of the one or more credentials associated with the UE 101s (e.g., UE 101*b*) and the one or more question templates in the parameter database 109.

Figure 3:
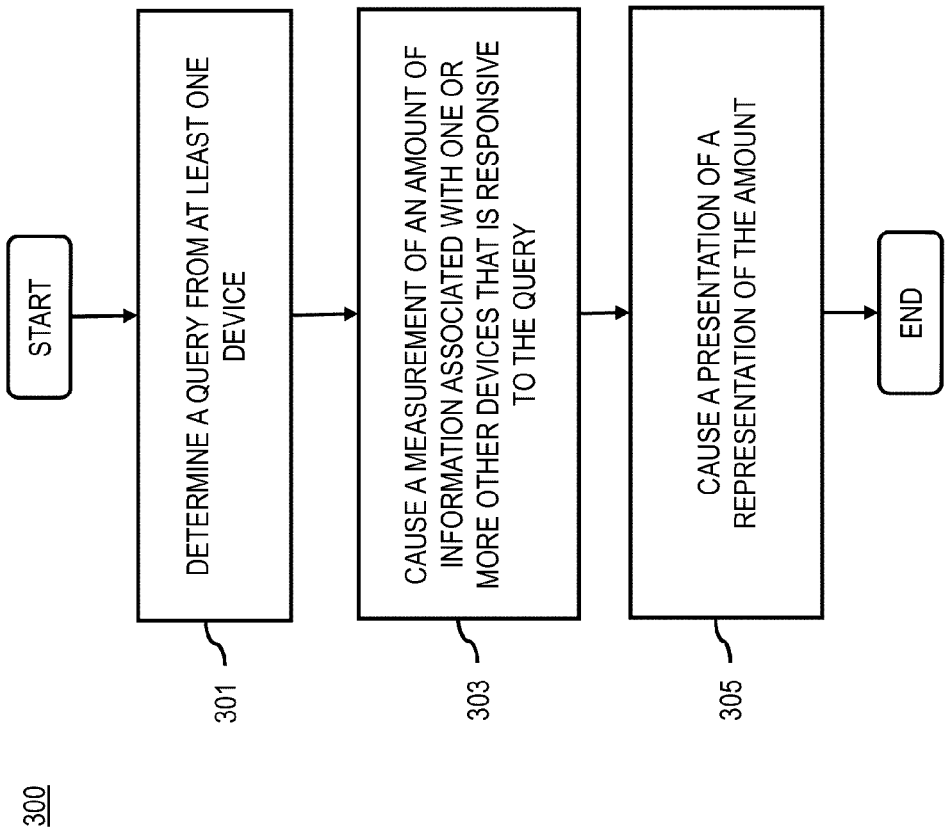
FIGS. 3-5 are flowcharts of processes for presenting a measure of relevant information stored on or associated with a nearby device using one or more lighting parameters and/or one or more short-range communication technologies, according to one embodiment.
Figure 4:
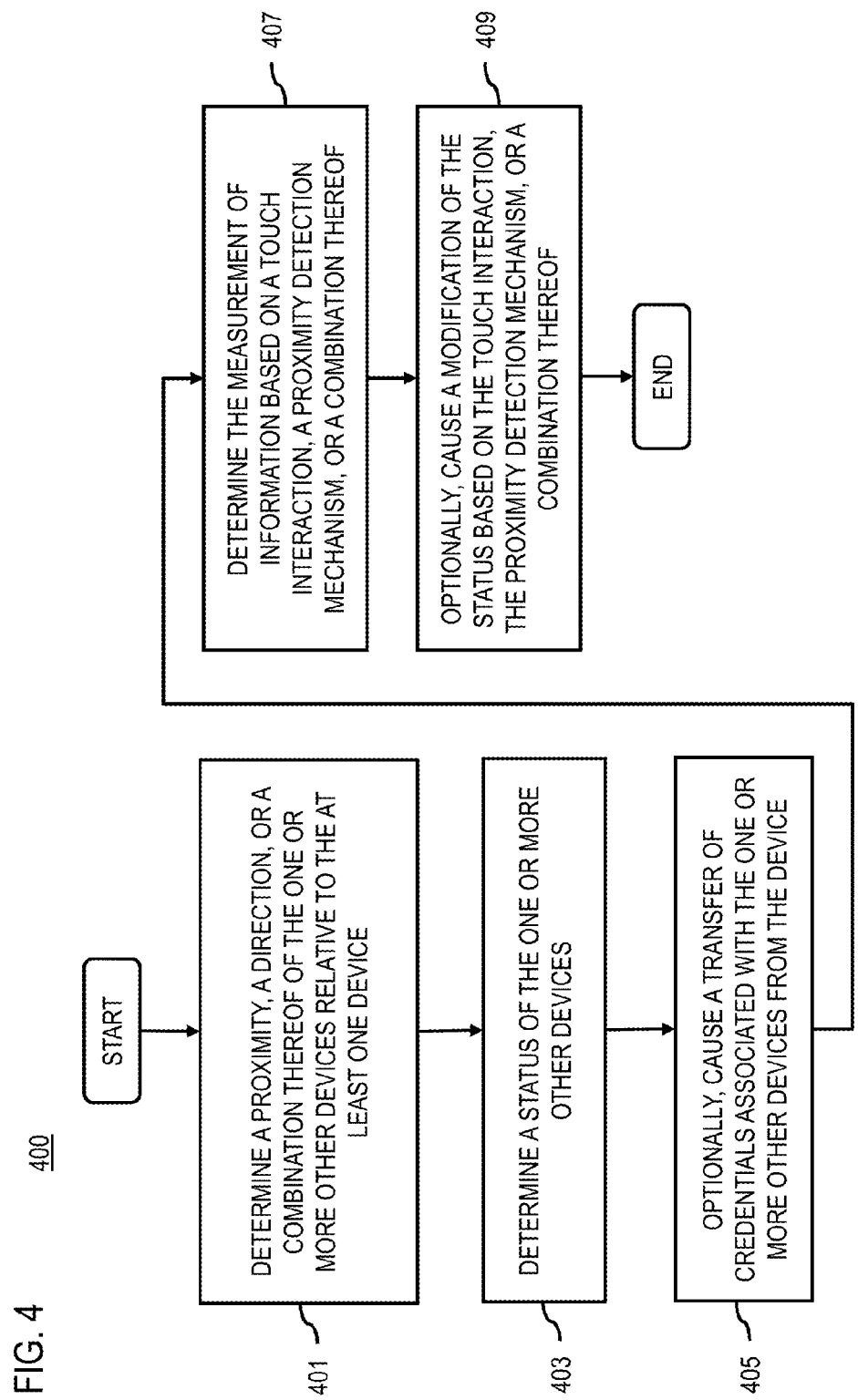
Figure 5:
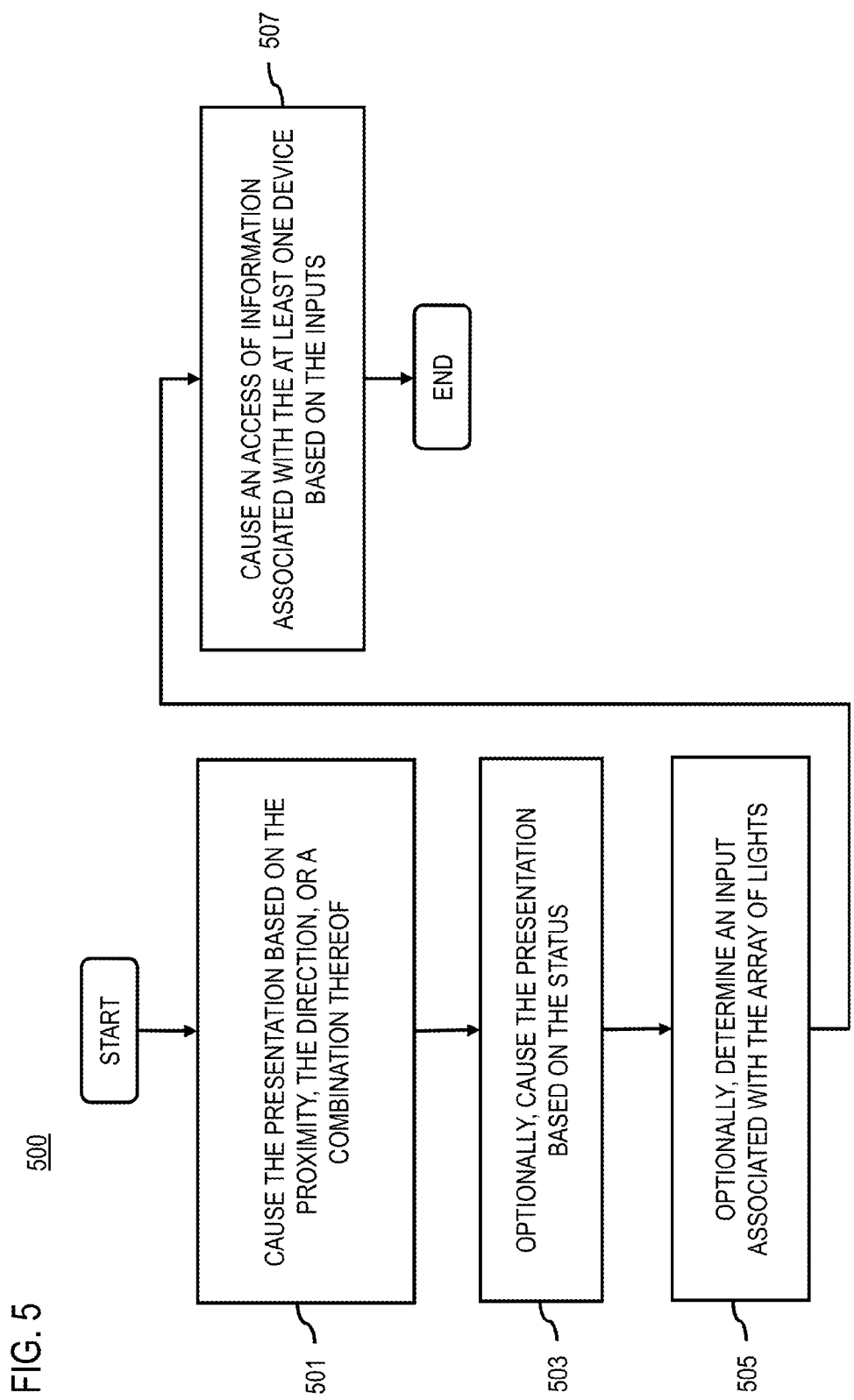
Figure 8:
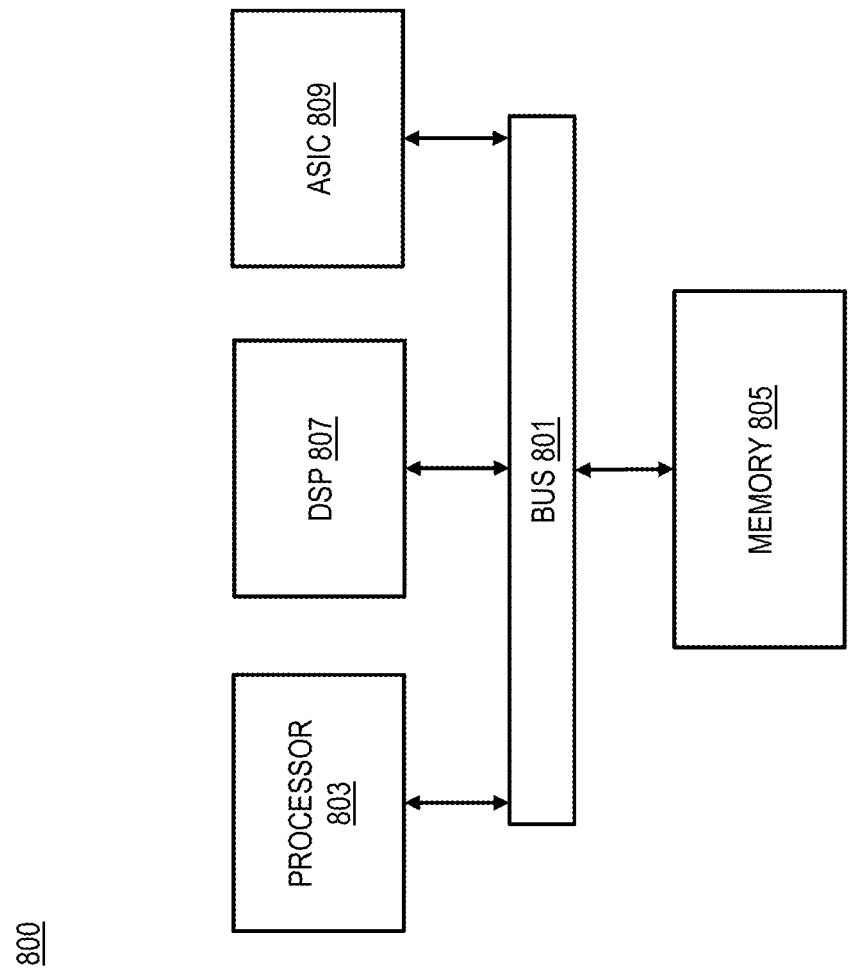
FIG. 8 is a diagram of a chip set that can be used to implement an embodiment of the invention.

FIGS. 3-5 are flowcharts of processes for presenting a measure of relevant information stored on or associated with a nearby device using one or more lighting parameters and/or one or more short-range communication technologies, according to one embodiment. In one embodiment, the information platform 103 performs the process 300 and is implemented in, for instance, a chip set including a processor and a memory as shown in FIG. 8. In step 301, the information platform 103 determines one or more queries from at least one device. By way of example, the at least one device may be a mobile device such as a mobile phone or a tablet that is equipped with one or more short-range communication technologies (Bluetooth, BLE, NFC, WiFi, or a combination thereof) and is associated with an array of one or more lights (e.g., color LEDs). Moreover, the one or more queries concern relevant information that is stored on or associated with the one or more other devices. For example, the one or more queries may include "how many unread e-mails?" or "how many status updates on a social networking service?" or "how many unseen media items?" In addition, as previously discussed, where privacy is less of a concern, the information platform 103 may determine queries such as "how many unseen television program records are on my DVR?" or "when will the next bus arrive?" In one embodiment, the information platform 103 determines the one or more queries based, at least in part, on a user freely typing the question on his or her mobile device, speech-to-text input, or utilizing one or more question templates for quick selection. Moreover, in one embodiment, the information platform 103 may determine a query based, at least in part, on a user inputting one or more different media types. For example, the query may include, at least in part, a textual component such as "How many photos are similar to this one?" and a visual component consisting of a photograph (e.g., "this one"). Further, in one embodiment, it is contemplated that the one or more other devices may be a biosensor connected to a user so that the information platform 103 can determine a query such as "How high is the blood sugar content?"

In step 303, the information platform 103 causes, at least in part, a measurement of an amount of information associated with one or more other devices that are responsive to the one or more queries. By way of example, in one example use case, the information platform 103 can measure the number of unread emails in respective accounts associated with the one or more other devices (e.g., 10 unread emails in Account "A" and 25 unread emails in Account "B"). Then in step 305, the information platform 103 causes, at least in part, a presentation of one or more representations of the amount. By way of example, the presentation includes, at least in part, an array of one or more lights and the one or more representations include, at least in part, one or more color parameters, a light intensity parameter, a blinking frequency parameter, a light direction parameter, or a combination thereof. Moreover, the array can be part of an additional functional cover for the at least one device or a "rubber band" type loop that is stretched around the at least one device and the at least one device and the array can communicate through a physical connection or one or more short-range communication technologies (e.g., NFC or Bluetooth). In addition, in one example use case, a user can define the mapping between the amount of information and a corresponding color of light. For example, the information platform 103 can cause, at least in part, the array to display a green color representing a large amount of relevant information, a yellow color representing some relevant information, and a red color to indicate that there is no relevant information.

FIG. 4 depicts a process 400 of measuring an amount of information associated with one or more other devices. In one embodiment, the information platform 103 performs the process 400 and is implemented in, for instance, a chip set including a processor and a memory as shown in FIG. 8. In step 401, the information platform 103 determines a proximity, a direction, or a combination thereof of the one or more other devices relative to the at least one device. By way of example, a user may request information (e.g., then number of unread emails), but does not know on which device this information is stored. In one embodiment, through the at least one device (e.g., a mobile phone), the information platform 103 can determine in which direction there is a device with relevant information based, at least in part, on an implementation of NFC or Bluetooth ID (e.g., the Bluetooth radio strength is used to measure which of the one or more other devices is closest to the at least one device making the query).

In step 403, the information platform 103 determines at least one status of the one or more other devices. By way of example, the information platform 103 can determine that the one or more other devices is running, in a stand-by mode, or is not able to exchange information whether because it does not have short-range communication capability or because it is turned off. If the information platform 103 determines that the one or more other devices is running, then in step 405, the information platform 103 can cause, at least in part, at least one transfer of one or more credentials associated with the one or more other devices from the at least one device, wherein the measurement of an amount of information is based, at least in part, on the one or more credentials. By way of example, the information platform 103 can transfer a user ID and/or a password for one or more email accounts, one or more social networking accounts, etc. In certain embodiments, it is contemplated that the information platform 103 may skip the credential checking and/or credential transmission step.

In step 407, the information platform 103 determines the measurement of the amount of information based, at least in part, on one or more touch interactions, one or more proximity detection mechanisms, or a combination thereof between the at least one device and the one or more other devices. By way of example, a user may place the at least one device (e.g., a mobile phone) in the proximity of the one or more other devices (e.g., a tablet) or on top of the one or more other devices (e.g., a DVR) to initiate the device query via NFC or Bluetooth. More specifically, holding the at least one device and the one or more other devices in close proximity to one another (i.e., the RSSI reading of the discoverable device reaches a threshold criteria relative to the discovering device) for a short duration of time may be enough to trigger operations, after which the devices may be separated and utilized within the communication range of whatever wireless interaction may be implemented utilizing various types of short-range wireless communication technologies (e.g., Bluetooth).

If the information platform 103 determines that the one or more other devices are in stand-by mode or turned off, then in step 409, the information platform 103 can cause, at least in part, at least one modification of the at least one status based, at least in part, on the one or more touch interactions, the one or more proximity detection mechanisms, or a combination thereof. By way of example, if a user places the at least one device in close proximity of the one or more other devices (i.e., starting the device query via NFC or Bluetooth), the at least one device can cause, at least in part, the one or more other devices to power-up. In the example use case where the one or more other devices are turned off, the information platform 103 can cause, at least in part, the at least one device to prompt the user to power-up the one or more other devices (e.g., by presenting a notification).

FIG. 5 depicts a process 500 of causing, at least in part, a presentation of one or more representations of the amount. In one embodiment, the information platform 103 performs the process 500 and is implemented in, for instance, a chip set including a processor and a memory as shown in FIG. 8. In step 501, the information platform 103 causes, at least in part, the presentation based, at least in part, on the proximity, the direction, or a combination thereof. By way of example, the array of one or more lights associated with the at least one device may indicate in which direction there are one or more of the one or more other devices that contain relevant information (e.g., the number of unread emails) and/or whether any such devices are nearby the at least one device. For example, a green array may indicate both the direction and the closeness of the one or more other devices. In step 503, the information platform 103 can cause, at least in part, the presentation based, at least in part, on the at least one status. For example, in the example use case where the one or more other devices are turned off, the information platform 103 can render the array of one or more lights as blinking pink lights.

In step 505, the information platform 103 can determine one or more inputs associated with the array of one or more lights. By way of example, a user can map the array of one or more lights to the at least one device so that the array can function as a reminder of unfinished tasks. As a result, the information platform 103 can determine a touch of the one or more lights by the user. Then in step 507, the information platform 103 causes, at least in part, at least one access of information associated with the at least one device based, at least in part, on the one or more inputs. For example, in this example use case, a result of touching the space near the one or more lights, the information platform 103 causes, at least in part, a presentation of unfinished tasks on the display of the device or on a connected larger display. More specifically, a user can map the 12-hour day along the circumference of the at least one device so that, e.g., a to-do event at 9 a.m. is presented by the information platform 103 as one or more powered lights on the left middle side of the at least one device. Further, before 9 a.m., the information platform 103 can render the one or more lights as green, for example, but if the user does not perform the task, the information platform 103 can render the one or more lights as red, for example.

Figure 6C:
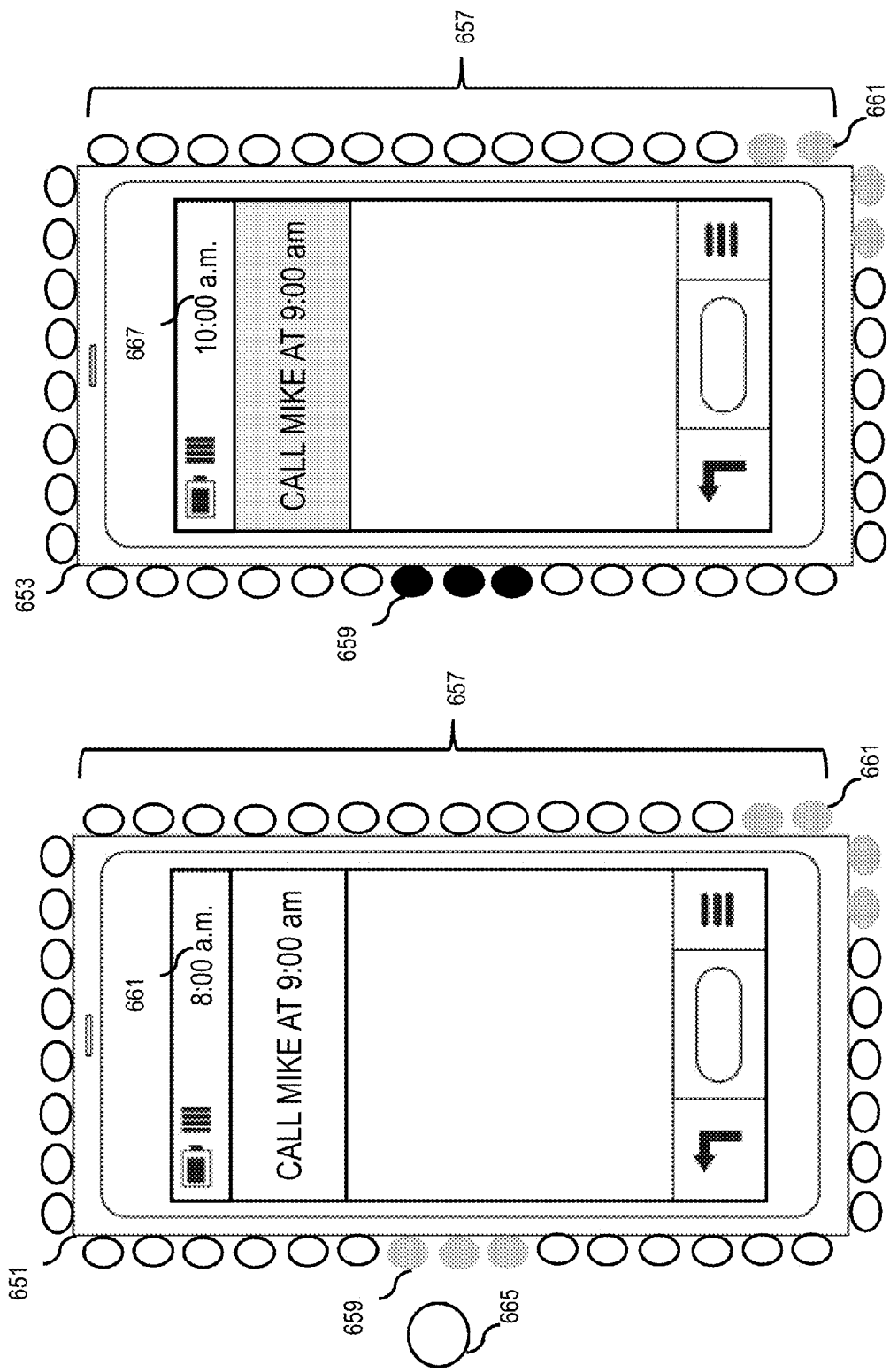

FIGS. 6A-6C are diagrams of user interfaces utilized in the processes of FIGS. 3-5, according to various embodiments. As shown, the example user interfaces of FIGS. 6A-6C include one or more user interface elements and/or functionalities created and/or modified based, at least in part, on information, data, and/or signals resulting from the processes (e.g., processes 300, 400, and 500) described with respect to FIGS. 3-5. More specifically, FIG. 6A illustrates two user interfaces (e.g., interfaces 601 and 603), wherein at least one device (e.g., interface 601) is associated with an array 605 of one or more lights (e.g., color LEDs) and has one or more short-range communication technologies (e.g., Bluetooth or NFC) as depicted by symbol 607 and one or more other devices (e.g., interface 603) also has one or more short-range communication technologies. In particular, the array 605 can be part of an additional functional cover for the interface 601 or a "rubber band" type loop that is stretched around the interface 601 and can communicate through a physical connection or one or more short-range communication technologies (e.g., NFC or Bluetooth).

In one embodiment, the system 100 determines one or more queries from the interface 601. For example, the system 100 can determine the one or more queries from one or more question templates such as "How many unread emails?" or "How many status updates?" or "Compare Media" as depicted in the display of interface 601. In one embodiment, the system 100 determines that the interface 603 is in a stand-by mode as depicted by the symbol 609. In this example use case, the system 100 then causes, at least in part, a measurement of an amount of information associated with the interface 603 that is responsive to the one or more queries (e.g., "How many unread emails?"). In particular, the system 100 determines the measurement based, at least in part, on one or more touch interactions, one or more proximity detection mechanisms, or a combination thereof between the interface 601 and the interface 603 as depicted by the symbol 611. As previously discussed, the interfaces (e.g., 601 and 603) are not required to actually come into physical contact with each other; they just need to be in close proximity to one another for a short duration of time.

In one embodiment, once the system 100 determines the measurement, the system 100 causes, at least in part, a presentation of one or more representations of the amount of information associated with the one or more other devices (e.g., interface 603). In this example use case, the number of powered lights on each side of the interface 601 represents the number of unread emails associated with the interface 603. Moreover, the system 100 can cause, at least in part, one representation (e.g., the one or more powered lights on the right of the interface 601) to correspond with one email account and one representation (e.g., the one or more powered lights on the left side of the interface 601) to correspond to another email account. In one embodiment, it is contemplated that rather than distinguishing the one or more email accounts by a location on the array 605, the system 100 could also distinguish the one or more email accounts by different colors, blinking frequency, light intensity (e.g., the lights corresponding to work emails are rendered brighter than the lights corresponding to personal emails), etc.

Similar to FIG. 6A, FIG. 6B illustrates two user interfaces (e.g., interfaces 631 and 633) depicting at least one device having an array 635 of one or more lights (e.g., color LEDs) surrounding the interface 631 and one or more short-range communication technologies (e.g., Bluetooth or NFC) as depicted by symbol 637 and one or more other devices (e.g., interface 633) that also has one or more short-range communication technologies. In one embodiment, once the system 100 determines one or more user-defined queries from the at least one device (e.g., the interface 631), the system 100 determines a proximity, a direction, or a combination thereof of the one or more other devices (e.g., the interface 633) having relevant information. For example, a user may request information (e.g., "How many social networking status updates"), but the user does not know on which device this information is stored. As a result, the system 100 determines through the at least one device (e.g., the interface 631) in which direction there is a device with information related to the user's question based, at least in part, on implementation of NFC or Bluetooth ID as depicted by the symbol 639. More specifically, in the example use case of Bluetooth, the Bluetooth radio strength is used to measure which of the one or more other devices is closest to the at least one device making the query. In one embodiment, once the system 100 determines that one or more other devices (e.g., interface 633) is located nearby the at least one device (e.g., interface 631) and contains relevant information, the system 100 causes, at least in part, a presentation of one or more representations. In this example use case, the system 100 causes, at least in part, a rendering of the one or more lights associated with the array 635 so that the user is informed that the one or more other devices are located to the right of interface 631 (i.e., the one or more lights can function much like a compass). As previously discussed, the one or more representations caused, at least in part, by system 100 may include, one or more color parameters, a light intensity parameter, a blinking frequency parameter, a light direction parameter, or a combination thereof.

FIG. 6C illustrates two user interfaces (e.g., interfaces 651 and 653) representing different times of the day. The interfaces 651 and 653 are associated with an array 657 of one or more lights (e.g., color LEDs). In one embodiment, the system 100 can determine one or more inputs associated with the array 657. By way of example, the user can map the array 657 of one or more lights to function as a reminder of unfinished tasks for the day as depicted with interface 651. More specifically, the groups of one or more lights 659 and 661 are associated with tasks mapped to 9:00 a.m. and 5:00 p.m., respectively. As previously discussed, it is contemplated that the one or more representations include, at least in part, one or more color parameters, a light intensity parameter, a blinking frequency parameter, a light direction parameter, or a combination thereof. In this example use case, the groups of one or more lights 659 and 661 are rendered as green lights because the time of the task (e.g., 9:00 a.m.) has not yet occurred as depicted by the time 663. In one embodiment, once the system 100 determines a touch of or near the one or more lights as depicted by symbol 665, the system 100 causes, at least in part, at least one access of information associated with the interface 651 (e.g., "call Mike at 9:00 a.m.") based, at least in part, on the one or more inputs (e.g., touch 655). In this example use case, the task mapped to 9:00 a.m. is a call to a friend "Mike." In one embodiment, when the system 100 determines that the task is incomplete and/or the time is past the mapped event (e.g., "call Mike at 9:00 a.m.") as depicted by the time 667, the system 100 can cause, at least in part, the one or more lights 659 to be rendered a different color (e.g., red in this example use case) to indicate that the task is overdue or incomplete.

The processes described herein for presenting a measure of relevant information stored on or associated with a nearby device using one or more lighting parameters and/or one or more short-range communication technologies may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
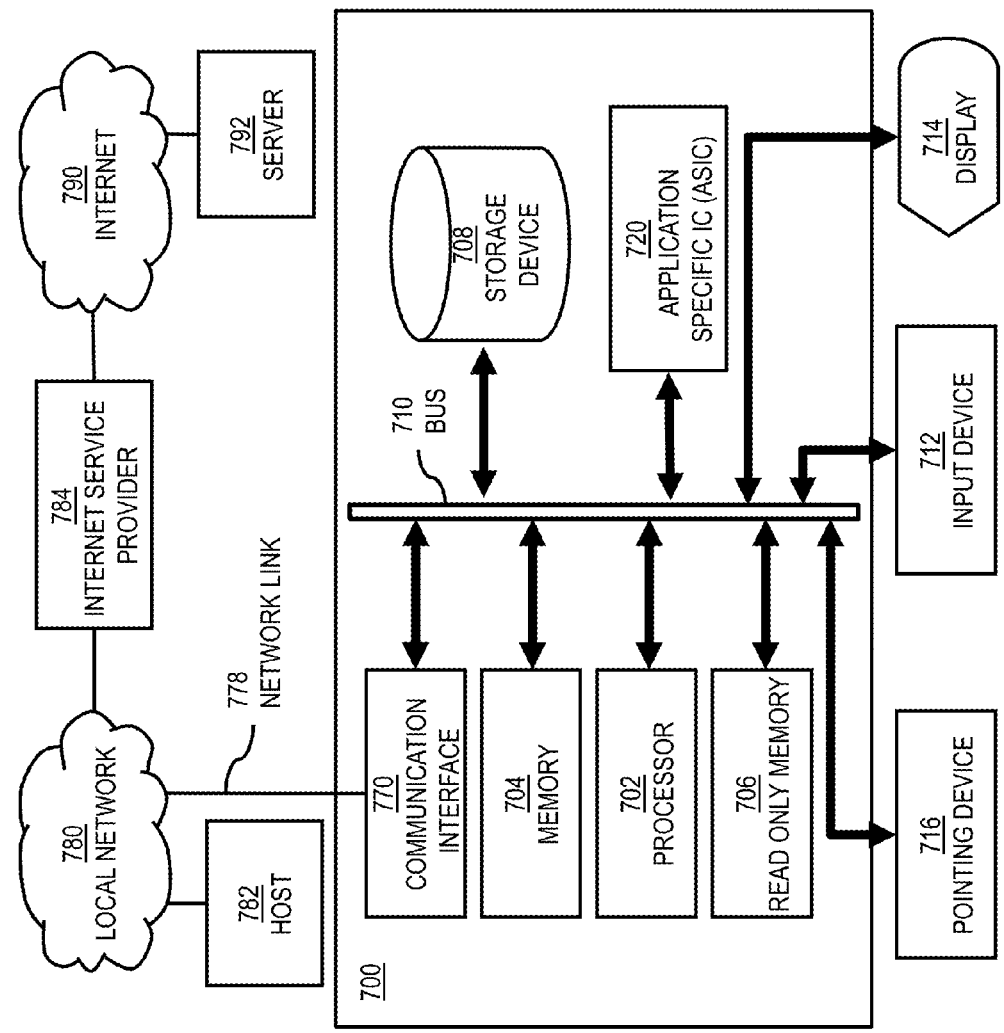
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to present a measure of relevant information stored on or associated with a nearby device using one or more lighting parameters and/or one or more short-range communication technologies as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of presenting a measure of relevant information stored on or associated with a nearby device using one or more lighting parameters and/or one or more short-range communication technologies.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to present a measure of relevant information stored on or associated with a nearby device using one or more lighting parameters and/or one or more short-range communication technologies. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for presenting a measure of relevant information stored on or associated with a nearby device using one or more lighting parameters and/or one or more short-range communication technologies. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for presenting a measure of relevant information stored on or associated with a nearby device using one or more lighting parameters and/or one or more short-range communication technologies, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for presenting a measure of relevant information stored on or associated with a nearby device using one or more lighting parameters and/or one or more short-range communication technologies to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to present a measure of relevant information stored on or associated with a nearby device using one or more lighting parameters and/or one or more short-range communication technologies as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of presenting a measure of relevant information stored on or associated with a nearby device using one or more lighting parameters and/or one or more short-range communication technologies.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to present a measure of relevant information stored on or associated with a nearby device using one or more lighting parameters and/or one or more short-range communication technologies. The memory 805 also stores the data associated with or generated by the execution of the inventive steps.

Figure 9:
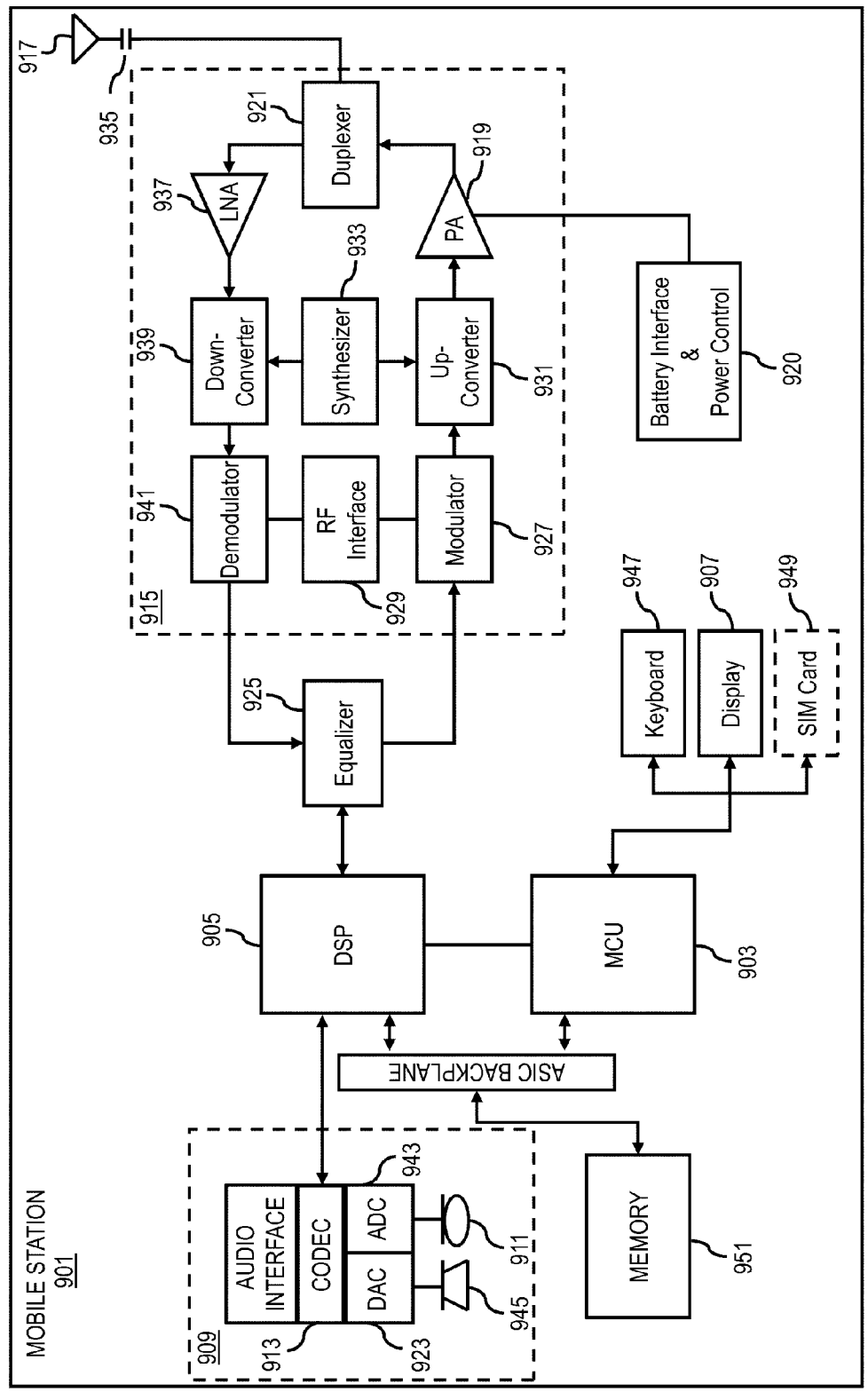
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of presenting a measure of relevant information stored on or associated with a nearby device using one or more lighting parameters and/or one or more short-range communication technologies. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of presenting a measure of relevant information stored on or associated with a nearby device using one or more lighting parameters and/or one or more short-range communication technologies. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to present a measure of relevant information stored on or associated with a nearby device using one or more lighting parameters and/or one or more short-range communication technologies. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more queries from at least one device;
   measuring an amount of information associated with one or more other devices that is responsive to the one or more queries based, at least in part, on one or more touch interactions, one or more proximity detection mechanisms, or a combination thereof between the at least one device and the one or more other devices; and
   presenting of one or more representations of the amount, wherein the presentation includes, at least in part, an array of lights around an interface of the at least one device, and wherein the one or more representations include, at least in part, one or more color parameters, a light intensity parameter, a blinking frequency parameter, a light direction parameter, or a combination thereof.

2. The method of claim 1, further based, at least in part, on the following:
   determining a proximity, a direction, or a combination thereof of the one or more other devices relative to the at least one device; and
   presenting the one or more representations of the amount based, at least in part, on the proximity, the direction, or a combination thereof.

3. The method of claim 1, further based, at least in part, on the following:
   determining at least one status of the one or more other devices; and
   presenting the one or more representations of the amount based, at least in part, on the at least one status.

4. The method of claim 3, further based, at least in part, on the following:
   modifying the at least one status based, at least in part, on the one or more touch interactions, the one or more proximity detection mechanisms, or a combination thereof.

5. The method of claim 2, further based, at least in part, on the following:
   determining one or more inputs associated with the array of lights; and
   accessing information associated with the at least one device based, at least in part, on the one or more inputs.

6. The method of claim 1, wherein the one or more queries include, at least in part, one or more user entries, one or more templates, one or more types of media, or a combination thereof.

7. The method of claim 1, further based, at least in part, on the following:
   transferring one or more credentials associated with the one or more other devices from the at least one device, wherein the measurement of an amount of information is based, at least in part, on the one or more credentials.

8. The method of claim 1, wherein the array of lights communicate with the at least one device through a physical connection or one or more short-range communication technologies.

9. The method of claim 1, wherein the array of lights are an array of light-emitting diode (LED) lights of various colors.

10. An apparatus comprising:
    at least one processor; and
    at least one memory including computer program code for one or more programs,
    the at least one memory and the computer program code configured to, with the at least one processor, cause the apparatus to perform at least the following:
    determine one or more queries from at least one device;
    cause, at least in part, a measurement of an amount of information associated with one or more other devices that is responsive to the one or more queries based, at least in part, on one or more touch interactions, one or more proximity detection mechanisms, or a combination thereof between the at least one device and the one or more other devices; and cause, at least in part, a presentation of one or more representations of the amount, wherein the presentation includes, at least in part, an array of lights around an interface of the at least one device, and wherein the one or more representations include, at least in part, one or more color parameters, a light intensity parameter, a blinking frequency parameter, a light direction parameter, or a combination thereof.

11. The apparatus of claim 10, wherein the apparatus is further caused to:
determine a proximity, a direction, or a combination thereof of the one or more other devices relative to the at least one device; and
cause, at least in part, the presentation based, at least in part, on the proximity, the direction, or a combination thereof.

12. The apparatus of claim 10, wherein the apparatus is further caused to:
determine at least one status of the one or more other devices; and
cause, at least in part, the presentation based, at least in part, on the at least one status.

13. The apparatus of claim 12, wherein the apparatus is further caused to:
cause, at least in part, at least one modification of the at least one status based, at least in part, on the one or more touch interactions, the one or more proximity detection mechanisms, or a combination thereof.

14. The apparatus of claim 10, wherein the apparatus is further caused to:
determine one or more inputs associated with the array of lights; and
cause, at least in part, at least one access of information associated with the at least one device based, at least in part, on the one or more inputs.

15. The apparatus of claim 10, wherein the one or more queries include, at least in part, one or more user entries, one or more templates, one or more types of media, or a combination thereof.

16. The apparatus of claim 10, wherein the apparatus is further caused to:
cause, at least in part, at least one transfer of one or more credentials associated with the one or more other devices from the at least one device,
wherein the measurement of an amount of information is based, at least in part, on the one or more credentials.

17. The apparatus of claim 10, wherein the array of lights communicate with the at least one device through a physical connection or one or more short-range communication technologies.

18. The apparatus of claim 10, wherein the array of lights are an array of light-emitting diode (LED) lights of various colors.

* * * * *